(12) United States Patent
Achtelik et al.

(10) Patent No.: US 11,017,681 B2
(45) Date of Patent: May 25, 2021

(54) UNMANNED AERIAL VEHICLE AVOIDING OBSTACLES

(71) Applicant: Intel IP Corporation, Santa Clara, CA (US)

(72) Inventors: Markus Achtelik, Woerthsee (DE); Jan Stumpf, Planegg (DE); Daniel Gurdan, Germering (DE)

(73) Assignee: Intel IP Corporation, Santa Clara, CA (US)

( * ) Notice: Subject to any disclaimer, the term of this patent is extended or adjusted under 35 U.S.C. 154(b) by 14 days.

(21) Appl. No.: 16/304,176

(22) PCT Filed: Jun. 24, 2016

(86) PCT No.: PCT/US2016/039151
§ 371 (c)(1),
(2) Date: Nov. 23, 2018

(87) PCT Pub. No.: WO2017/222542
PCT Pub. Date: Dec. 28, 2017

(65) Prior Publication Data
US 2020/0043352 A1 Feb. 6, 2020

(51) Int. Cl.
*G08G 5/04* (2006.01)
*B64C 39/02* (2006.01)
(Continued)

(52) U.S. Cl.
CPC ............ *G08G 5/045* (2013.01); *B64C 39/024* (2013.01); *B64D 47/08* (2013.01); *G05D 1/0038* (2013.01);
(Continued)

(58) Field of Classification Search
CPC .............................. G08G 5/045; B64C 39/024; B64C 2201/027; B64C 2201/145;
(Continued)

(56) References Cited

U.S. PATENT DOCUMENTS 9,632,509 B1\* 4/2017 Aphek .................. B64C 39/024
2010/0100269 A1\* 4/2010 Ekhaguere ........... G08G 5/0021
701/26
(Continued)

FOREIGN PATENT DOCUMENTS

EP 2177966 A2 4/2010

OTHER PUBLICATIONS

Anonymus, "Phantom 4 User Manulal v1.2", pp. 1-65, XP055346335, Retrieved from the internet: https://dl.djicdn.com/downloads/phantom_4/en/Phantom_4_User_Manual_en_v1.2_160328.pdf (retrieved on Feb. 2017).
(Continued)

*Primary Examiner* — Marthe Y Marc-Coleman
(74) *Attorney, Agent, or Firm* — Viering Jentschura&Partner MbB

(57) ABSTRACT

An unmanned aerial vehicle may include a flight control circuit configured to control flight of the unmanned aerial vehicle and to provide a flight path based at least on an actual position of the unmanned aerial vehicle and a desired target position for the unmanned aerial vehicle; and at least one sensor configured to monitor an environment of the unmanned aerial vehicle and to detect one or more obstacles in the environment; wherein the flight control circuit is further configured to determine a local flight path to avoid a collision with one or more detected obstacles, and to superimpose the flight path with the local flight path, thereby generating a flight path to the desired target position avoiding a collision with the one or more detected obstacles.

20 Claims, 14 Drawing Sheets

(51) Int. Cl.
  *B64D 47/08* (2006.01)
  *G05D 1/00* (2006.01)
  *G05D 1/10* (2006.01)
(52) U.S. Cl.
  CPC ........ *G05D 1/102* (2013.01); *B64C 2201/027* (2013.01); *B64C 2201/145* (2013.01)
(58) Field of Classification Search
  CPC ........ B64C 2201/127; B64C 2201/141; B64D 47/08; G05D 1/0038; G05D 1/102
  See application file for complete search history.

(56) References Cited

U.S. PATENT DOCUMENTS

| | | | | |
|---|---|---|---|---|
| 2014/0081505 A1* | 3/2014 | Klinger | .................. | G08G 5/003 701/25 |
| 2014/0192193 A1* | 7/2014 | Zufferey | ................ | H04N 7/183 348/144 |
| 2015/0336667 A1* | 11/2015 | Srivastava | ........... | G05D 1/1064 701/2 |
| 2016/0070265 A1* | 3/2016 | Liu | ........................ | G01C 21/00 701/3 |
| 2016/0189537 A1* | 6/2016 | Huang | .................. | A63H 30/04 340/12.5 |
| 2017/0270803 A1* | 9/2017 | High | .................... | G05D 1/0202 |

OTHER PUBLICATIONS

Anonymus, "DJI Phantom 4—Specs, FAQ, Tutorials and Downloads", Internet, Apr. 2016, XP055346315, Retrieved from the internet: http://web.archive.org/web/20160426061819/http://www.dji.com/product/phantom-4/info (retrieved on Feb. 2017).

International Search Report received for PCT Application No. PCT/US2016/039151, dated Apr. 20, 2017, 18 pages.

* cited by examiner

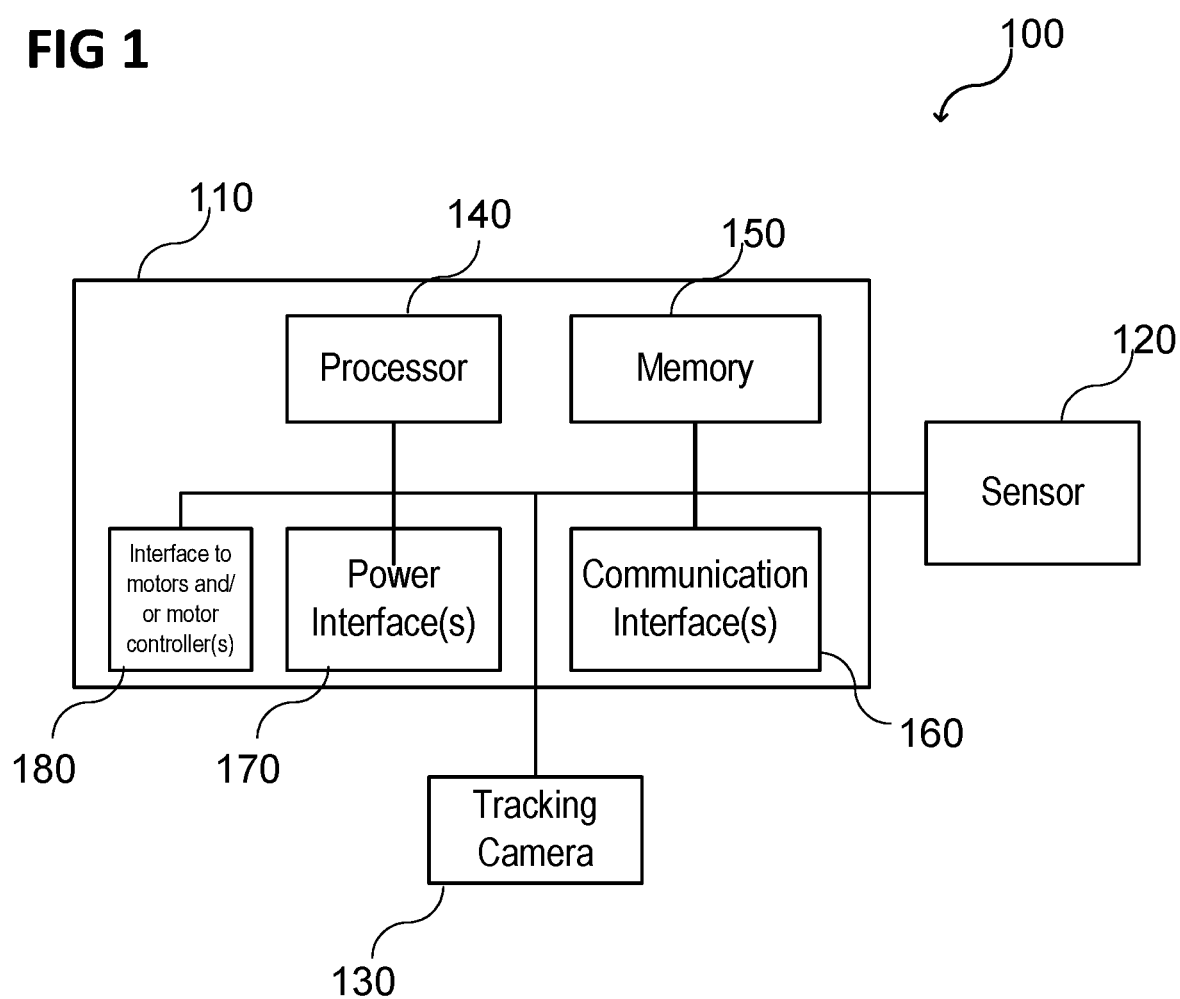

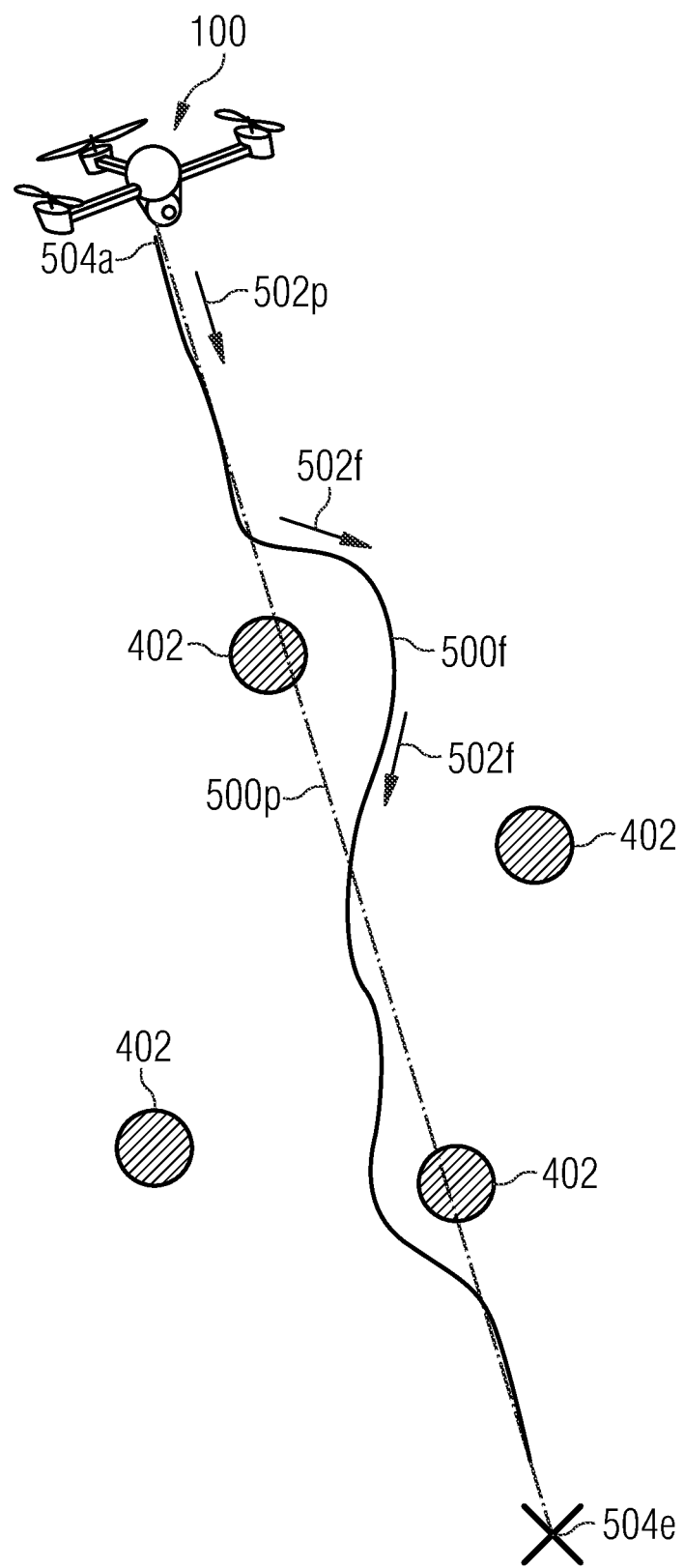

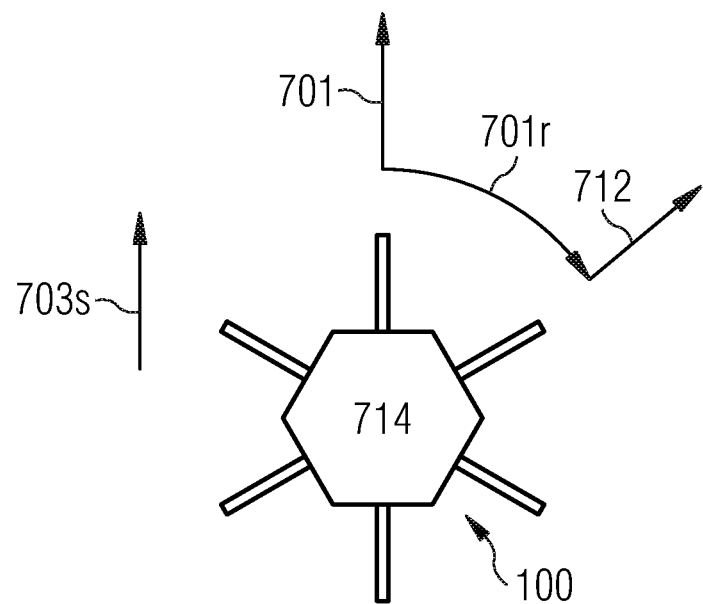

UNMANNED AERIAL VEHICLE AVOIDING OBSTACLES

This application is a U.S. National Phase Application of Patent Cooperation Treaty Application PCT/US2016/039151, filed on Jun. 24, 2016, the entirety of which is hereby incorporated by reference.

TECHNICAL FIELD

Various aspects of this disclosure generally relate to an unmanned aerial vehicle a method for controlling an unmanned aerial vehicle.

BACKGROUND

A conventional unmanned aerial vehicle (UAV) may have a flight controller to control flight of the unmanned aerial vehicle along a predefined flight pass. The flight path may be provided for example by manual control, waypoint control or target tracking. Further, obstacle detection may be provided to avoid collision of the unmanned aerial vehicle with an obstacle located in the flight path of the unmanned aerial vehicle. Conventional obstacle detection may be configured to stop the unmanned aerial vehicle in front of a detected obstacle to avoid the collision. However, the case that the unmanned aerial vehicle stops in front of an obstacle, for example, a tracked target may be lost or the unmanned aerial vehicle may be manually controlled to properly continue flight.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows a block diagram illustrating the electronic circuits provided in an unmanned aerial vehicle;

FIG. 5 shows a schematic diagram of obstacle avoidance of an unmanned aerial vehicle;

FIG. 7C shows a schematic diagram of heading control of an unmanned aerial vehicle;

Figure 2A:
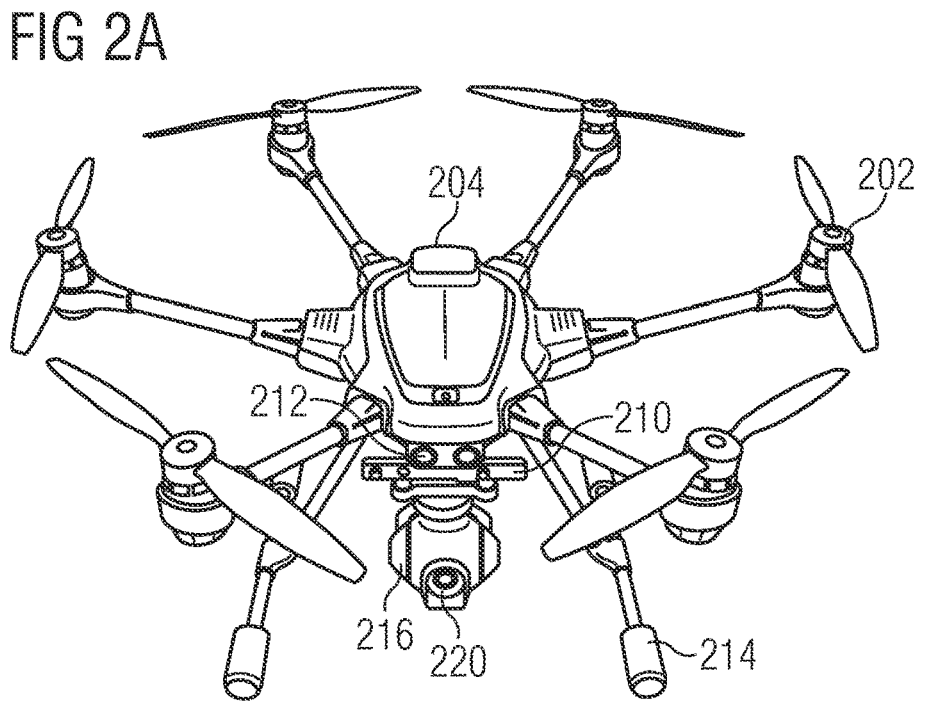
FIGS. 2A to 2C show an unmanned aerial vehicle in different views.

The following detailed description refers to the accompanying drawings that show, by way of illustration, specific details and embodiments in which the invention may be practiced.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments may be combined with one or more other embodiments to form new embodiments. Various embodiments are described in connection with methods and various embodiments are described in connection with devices. However, it may be understood that embodiments described in connection with methods may similarly apply to the devices, and vice versa.

The terms "at least one" and "one or more" may be understood to include any integer number greater than or equal to one, i.e. one, two, three, four, [ ... ], etc. The term "a plurality" may be understood to include any integer number greater than or equal to two, i.e. two, three, four, five, [ ... ], etc.

The term alignment used with regards to a "alignment of a sensor", "alignment of a direction", "alignment of a vector", and the like, may be used herein to mean a pointing direction or pointing vector in a three dimensional space. Two directions are referred to as being in alignment if they are substantially parallel to each other, e.g. with a deviation of less than about 5°.

The term 3D-movement vector may be used herein to mean a vectorial description of a movement in a three dimensional space, including like any vector a direction and a value, wherein the value is a magnitude or norm of the vector.

The term position used with regards to a "position of a UAV", "position of an obstacle", "position of a target", and the like, may be used herein to mean a point in a three dimensional space. It goes without saying that suitable coordinate systems with respective reference points are used to describe positions, vectors, and the like.

An unmanned aerial vehicle (UAV) is an aircraft that has the capability of autonomous flight. In autonomous flight, a human pilot is not aboard and in control of the UAV. The UAV may also be denoted as unstaffed, uninhabited or unpiloted aerial vehicle, -aircraft or -aircraft system or drone.

The UAV, according to various aspects, includes a support frame that serves as basis for mounting components of the UAV, as for example, motors, sensors, mechanic, transmitter, receiver, and any type of control to control the functions of the UAV as desired. The The UAV, according to various aspects, includes a camera gimbal having an independent two- or three-axes degree of freedom to properly track a target, e.g. a person or point of interest, with a tracking camera independently of an actual flight direction or actual attitude of the unmanned aerial vehicle.

The UAV, according to various aspects, includes at least one sensor for obstacle detection, e.g. only one sensor, two sensors, or more than two sensors. The at least one sensor may be fixedly mounted on the support frame of the UAV. Alternatively, the at least one sensor may be fixed to a movable mounting structure to allow the at least one sensor be aligned into a desired direction. The number of sensors for obstacle detection may be reduced to only one sensor that is directed into a heading direction of the UAV. By using only exactly one sensor, which is fixedly mounted to the support frame, wherein the main axis of the detection angle is the heading direction of the UAV, it is always ensured that the obstacle detection properly works if the flight direction of the UAV is substantially directed into the heading direction of the UAV.

The heading direction of the UAV may be understood as a reference direction assigned with a straight forward flight direction. Without loss of generality the heading direction may be assigned to an x-axis of a Cartesian coordinate system, where the UAV is the reference point (e.g. the zero point) of the Cartesian coordinate system. Illustratively, if the sensors for obstacle detection are arranged with the main axis of the detection angle parallel to the heading direction, the flight of the UAV may be controlled to align the actual flight direction substantially into the heading direction. Therefore, a proper collision protection is provided.

An alignment of the tracking camera may be controlled independently from an alignment obstacle detection sensor. Thus, manufacturing costs may be reduced and at the same time, a reliability of the sensor system is also improved. In addition, energy required for operating may be saved and, thus, the maximal time of flight may be increase.

The UAV described herein may be in the shape of an airplane (e.g. a fixed wing airplane) or a copter (e.g. multi rotor copter), i.e. a rotorcraft UAV, e.g. a quad-rotor UAV, a hex-rotor UAV, an octo-rotor UAV.

The UAV may be configured to operate with various degrees of autonomy: under remote control by a human operator, or fully or intermittently autonomously, by onboard computers. The UAV may be configured to take-off and land autonomously control in take-off or landing mode. Alternatively, the UAV may be controlled manually by Radio Control (RC) at take-off and landing. The UAV may switch into a GPS-guided autonomous mode at a safe altitude or save distance. In another mode or design, the UAV is controlled manually by RC during flight, e.g. temporarily.

FIG. 1 shows a block diagram illustrating the electronic circuits provided in an unmanned aerial vehicle (UAV) 100. The UAV 100 may include at least a flight controller 110, a sensor arrangement 120 (i.e. at least one sensor) and a tracking camera 130. The sensor arrangement may be formed by or consist of a sensor array which may include at least one sensor. The tracking camera 130 may also be denoted as a camera 130. The flight controller 110 may be referred to as flight control circuit configured to control flight of the UAV 100.

The UAV 100 further includes a support frame. Components of the UAV may be mounted at the support frame. The UAV 100 is further configured to carry a payload, e.g. a camera gimbal and the camera 130, as described in more detail below.

The flight controller 110 includes a processor 140, a memory 150, one or more communication interface(s) 160, one or more power interface(s) 170 and one or more interface(s) 180 to one or more motor(s) and/or motor controller(s). Some or all of the electronic circuits and/or interface(s) may be arranged on one or more printed circuit boards (PCBs).

The flight controller 110 may be any type of controller suitable for controlling the desired functions of the UAV 100. The processor 140 may be implemented by any kind of one or more logic circuits. The memory 150 may be implemented by any kind of one or more electronic storing entities, e.g. a semiconductor memory or a computer data storage, e.g. a RAM, a SD card or a SSD memory. The one or more communication interface(s) 160 may be one or more wireline or wireless communication interfaces. A communication interface may include a transceiver circuit configured to provide an uplink transmission and/or downlink reception of radio signals including data, e.g. video or image data and/or commands. The transceiver circuit may include a radio frequency (RF) transmitter and/or a radio frequency (RF) receiver. The one or more power interface(s) 170 may be one or more wireline or wireless power supply interfaces.

Further, the UAV 100 includes at least one power supply that is electrically connected to the power interface(s) 170. At least one battery may be part of the power supply. The battery may be or include one or more batteries such as e.g. one or more lithium-polymer batteries (Li—Po). The battery/batteries may be exchangeable, e.g. in order to charge the respective battery/batteries.

The flight controller 110 may further include a camera power interface to supply power to the camera 130 mounted at the camera holder (also referred to as camera mount).

The UAV 100 may further have a battery elimination circuitry (BEC). The battery elimination circuitry may centralize power distribution. The battery elimination circuitry may include a microcontroller unit (MCU). The battery elimination circuitry may be a switching battery elimination circuitry. Thus, heat generation may be diminished.

The flight controller 110 may further include an inertial measurement unit (IMU) circuit and a compass circuit. The IMU allows a calibration of the UAV 100 regarding a predefined plane in a coordinate system. The IMU allows to determine the roll and pitch angle of the UAV with respect to the gravity vector (e.g. from planet earth). Thus, an orientation of the UAV 100 in a coordinate system may be determined. The orientation of the UAV may be calibrated using the IMU before the UAV 100 is operated. The orientation of the UAV in space may be referred to as the attitude of the UAV. The compass circuit may include a global positioning circuit (GPS) for determining the position of the UAV in a coordinate system, e.g. a coordinate system of the sensor 120. If a compass circuit is available, it also allows to determine the absolute yaw (or heading) angle of the UAV 100. However, any other suitable component for navigation of the UAV, e.g. for determining a position, a flight velocity, a flight direction, and the like may be implemented into the flight controller 110 or may be coupled to the flight controller 110 if desired.

The sensor arrangement 120 is or includes at least one obstacle detection sensor (e.g. a 3D camera sensor). The at least one obstacle detection sensor is configured to detect a respective position of one or more obstacles in a coordinate system of the respective sensor. The sensor arrangement 120 may be formed of or may consist of a sensor array having at least one sensor. The sensor array may have a limited visual field, e.g. of approximately 90 degrees or less, wherein in this case, the sensor is mounted to the support frame substantially aligned with the heading direction of the unmanned aerial vehicle.

The sensor 120 is configured to generate detection signals and forwards them to the memory 150. The processor 140 is configured to retrieve the detection signals from the memory 150 and to process them to provide obstacle detection. Based on the state information (e.g. including position, attitude) from the flight controller 110, the coordinates of the obstacles are transformed into a fixed coordinate system, in which the collision avoidance (CA) algorithm creates a map of obstacles. From this map of obstacles, the CA algorithm computes a feasible, collision free, path for the UAV 100, as described in more detail below.

In case the one or more obstacle detection sensors have a limited field of view (FOV), the CA algorithm chooses the orientation of the UAV, wherein the direction of flight always lies within the FOV of the obstacle detection sensors 120. In case of a sudden change of the direction of flight, computed by the CA algorithm, the CA algorithm slows down the forward speed first, until the UAV has turned to bring the obstacle detection sensors and therefore the heading direction of the UAV into the new direction of flight.

The tracking camera 130 is configured to generate image signals and/or video signals and to transmit the same to the memory 150. The processor 140 is configured to retrieve the image and/or video signals of the tracking camera 130 from the memory 150 and processes the same to provide a target tracking, as described in more detail below. A target may be, e.g. a person or point of interest that may be stationary or mobile. Target tracking may provide a flight path for the UAV, wherein the UAV is controlled to follow the flight path. However, obstacle detection may be provided to alter the flight path to circumvent one or more obstacles located in the flight path, as described in more detail below.

Tracking the target may be achieved in many ways. However, the target tracking method provides the angle, and optionally the distance, of the target relative to the UAVs 100 coordinate frame. As an example method for target tracking, a GPS signal from a GPS receiver of the UAV as well as a GPS receiver of a target to be tracked may be used to provide this information.

Further, the processor 140 may be configured to generate gimbal control signals to control an alignment of the gimbal. That is, the flight controller 110 includes at least a sensor and obstacle avoidance (SOA) circuit (also denoted as obstacle avoidance controller) and an image data and gimbal control (IDGC) circuit. The SOA circuit and the IDGC circuit may be implemented by use of the described components of the flight controller 110.

The SOA circuit may be configured to receive sensor data from the at least one sensor of the sensor array of the sensor arrangement 120 of the UAV 100. The SOA circuit is further configured to determine obstacle avoidance data based on the sensor data.

As described herein, a sensor system (also referred to as sensor circuit) may be configured to sense obstacles and to provide obstacle position data, accordingly. An obstacle avoidance controller (also referred to as obstacle avoidance circuit) may be configured to receive the obstacle position data from the sensor arrangement and to determine obstacle avoidance data based on the obstacle position data. The obstacle position data may be used to alter a flight path of the UAV during flight controlled by the UAV itself. Therefore, the UAV may immediately react on, for example, moving obstacles or obstacles that are not considered in the original flight path of the UAV.

Further, the obstacle avoidance controller may be configured to receive a first signal representing a first 3D-movement vector of the unmanned aerial vehicle; the first 3D-movement vector includes a first 3D-direction and a first 3D-velocity. The first 3D-movement vector may define the flight path or a part of the flight path of the UAV based on manual control (e.g. user stick control) or automated control (e.g. target following control or GPS waypoint control, and the like). Further, the obstacle avoidance controller may be configured to generate a second signal based on the first signal and the determined obstacle avoidance data, the second signal representing a second 3D-movement vector of the unmanned aerial vehicle; the second 3D-movement vector includes a second 3D-direction and a second 3D-velocity. The second 3D-movement vector may define an altered flight path or a part of an altered flight path of the UAV. If all relevant obstacles are considered by the obstacle avoidance process, the altered flight path is a collision free flight path. The collision free flight path is directed to the same target position as the original flight path of the UAV; therefore, the UAV may continue movement towards the desired target position in case of an obstacle avoidance situation. Illustratively, the original flight path of the UAV may be locally changed to avoid collision with an obstacle by the obstacle avoidance controller. The original flight path of the UAV may only be changed by the obstacle avoidance controller in a minimal way to circumvent one or more detected obstacles; therefore, the UAV substantially moves into the direction of the desired target position.

The second 3D-movement vector may define the flight path or a part of the flight path of the UAV based manual control (e.g. user stick control) or automated control (e.g. target following control or GPS waypoint control, and the like) under consideration of obstacle avoidance. Therefore, at least the second 3D-direction of the second 3D-movement vector differs from the first 3D-direction of the first 3D-movement vector. The flight controller 110 of the UAV may be configured to navigate the UAV towards a desired target position under consideration of navigation corrections to avoid collision with detected obstacles, as described in more details below.

The IDGC circuit is configured to receive image data from the camera 130 mounted in a camera holder that is mounted in a camera gimbal. The IDGC circuit is further configured to determine camera gimbal control data to control movement of the camera gimbal based on the image data.

Figure 2B:
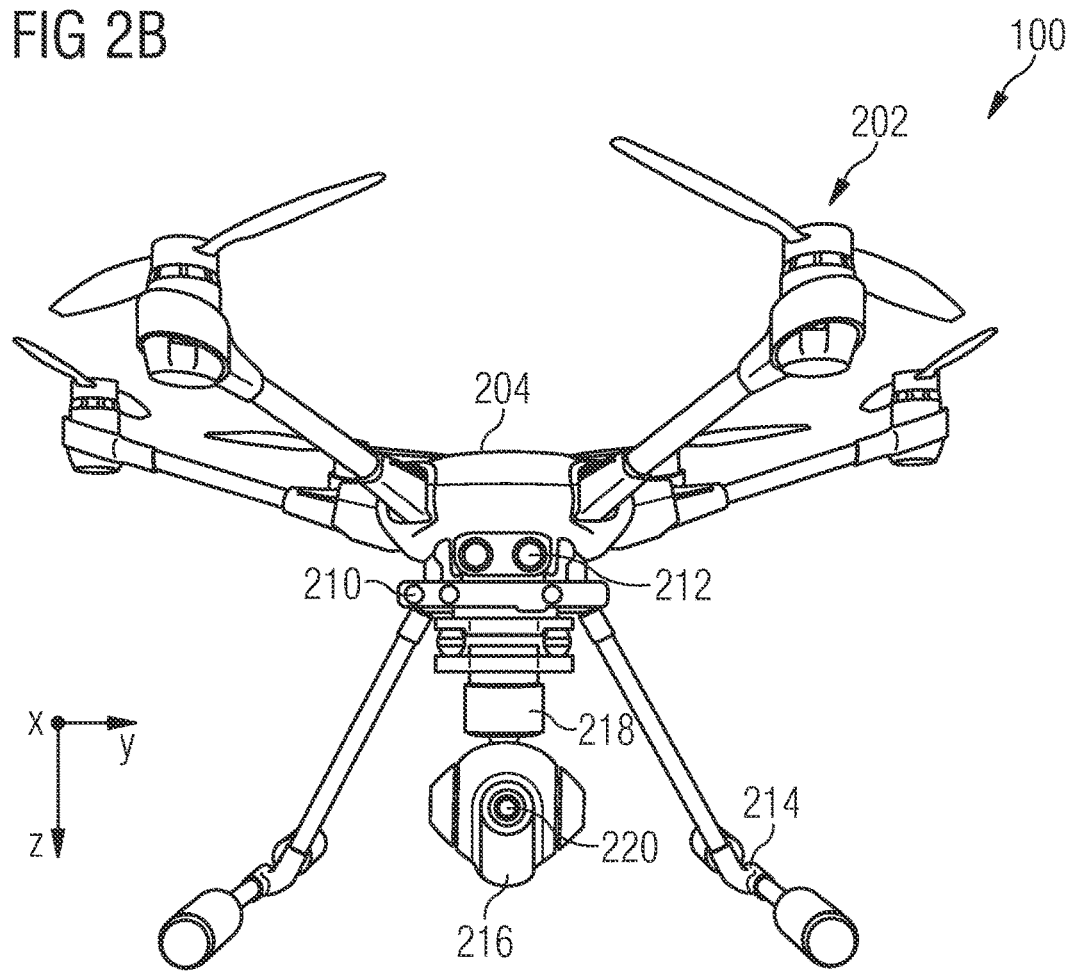
Figure 2C:
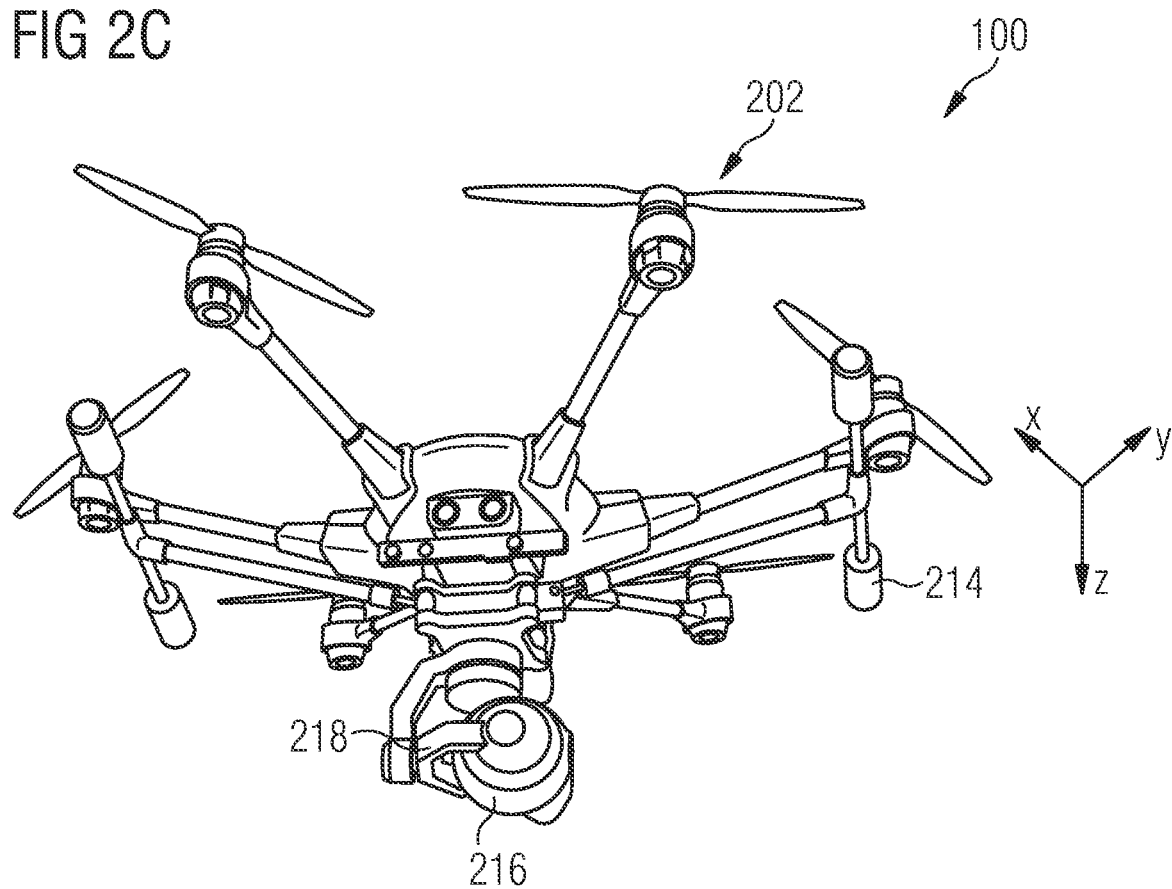

FIGS. 2A to 2C show images of an UAV 100 as described above. FIG. 2A shows a top-front view of the UAV 100. FIG. 2B shows a detailed front view on the UAV 100. FIG. 2C shows the UAV 100 during flight operation.

The support frame may include a plurality of tubes, e.g. a plurality of metal tubes (at least some of them may be hollow tubes). A housing 204 is mounted on and/or around the support frame. The housing 204 may accommodate one or more batteries of the power supply and one or more electronic circuits of the flight controller to control the UAV 100.

Moreover, one or more motors with respectively coupled rotors 202 is/are mounted at the support frame, e.g. one, two, four, six or eight motors, or any other desired number of motors.

As also shown in FIGS. 2A-C, a sensor arrangement including a sensor array 210 formed by e.g. exactly one sensor 210 that is mounted at the support frame. The sensor array is fixedly aligned with the main axis of the detection angle that is the x-axis of the UAV, i.e. the heading direction of the UAV. The sensor arrangement may, in addition, include an ultrasonic sensor 212 (also referred to as sonar sensor 212).

The sensor array has a detection field of about 60 to about 90 degrees and thus may detect the environment in the angular field (i.e. spherical sector) from about ±30 or ±45 degrees from the heading direction (see the x-axis in FIG. 2B) of the UAV 100. The sensor array may be fixedly aligned with a main axis of a detection angle, e.g. the sensor array is fixedly aligned with a main axis of the visual field. The sensor is fixed (i.e. cannot be moved) relative to the support frame. Alternatively, the sensor may be moveably mounted to the support frame. The detection field may be a visible field.

The sensor array may include a plurality of sensors; however, the entirety of sensors in the sensor array only covers a limited visual field. Alternatively, the entirety of sensors in the sensor array may be configured to detected obstacles in any direction with a non-limited visual field, e.g. 360 degree in the x-y-plane of the UAV's coordinate system.

The at least one sensor used for obstacle detection (i.e. for monitoring the environment of the UAV and detecting one or more obstacles in the environment) may be an optical sensor, a sonar, a radar, or any other suitable type of sensor. The at least one sensor used for obstacle detection may be configured to detect a distance from the UAV 100 to an obstacle. The at least one sensor used for obstacle detection may be configured to detect a pointing direction from the UAV 100 to an obstacle. The sensor 210 may be an Intel® RealSense™ sensor. The at least one sensor may be configured to monitor the environment in a radius of about 10 m, 20 m, 30 m, 40 m, 50 m, 60 m, 70 m, 80 m, 90 m, or 100 m, around the unmanned aerial vehicle.

The camera gimbal 218 is mounted to the support frame. The camera gimbal 218 includes a camera holder 216. The gimbal 218 is configured to provide a free continuous 360 degree movement of the camera holder 216 around the z-axis of the UAV 100. The z-axis has at least a component perpendicular to the x-axis and the gimbal 218 may extend along the z-axis. The z-axis may not be perpendicular to x-axis and/or y-axis. The movement of the camera holder 216 is independent from the detection angle or field of view of the sensor array 210.

In addition, the gimbal 218 may be configured to provide a multiple of the continuous 360 degree movement, e.g. 540 degrees, 720 degrees or even unlimited continuously adjustable rotation. In other words, the gimbal may rotate without stop, e.g. by means of a ball bearing.

The gimbal 218 may be a two axis gimbal. Alternatively, the gimbal may be a three axis gimbal. This way, the gimbal may soften up jitters of the support frame. In addition, yaw of the camera tracking may be smoothed by the three axis gimbal. The movement of the gimbal 218 may be locked in a determinable position.

The UAV 100 may further include a camera 220. The camera 220 is mounted in or at the camera holder 216 of the camera gimbal 218. The camera 220 may be a tracking camera 220. The camera 220 may be completely independent from the sensor array for obstacle detection 210, e.g. the camera 220 movement of the tracking camera 220 may be independent from obstacle avoidance data. Thus, the tracking camera 220 may be rotated via the gimbal 218 freely and continuously 360 degree around the z-axis of the UAV 100. Illustratively, the tracking camera is completely independent from the sensor 210. Thus, the tracking camera 220 may track a target or POI independently from the sensor 210.

The UAV 100 may further include an integrated landing gear 214. The landing gear 214 may be retractable. In FIG. 2C, the UAV 100 is shown in flight operation with a retracted landing gear 214. This way, an unobstructed view for the camera 220 is enabled in the continuous 360 degree movement of the camera holder 216 of the gimbal 218.

Figure 3A:
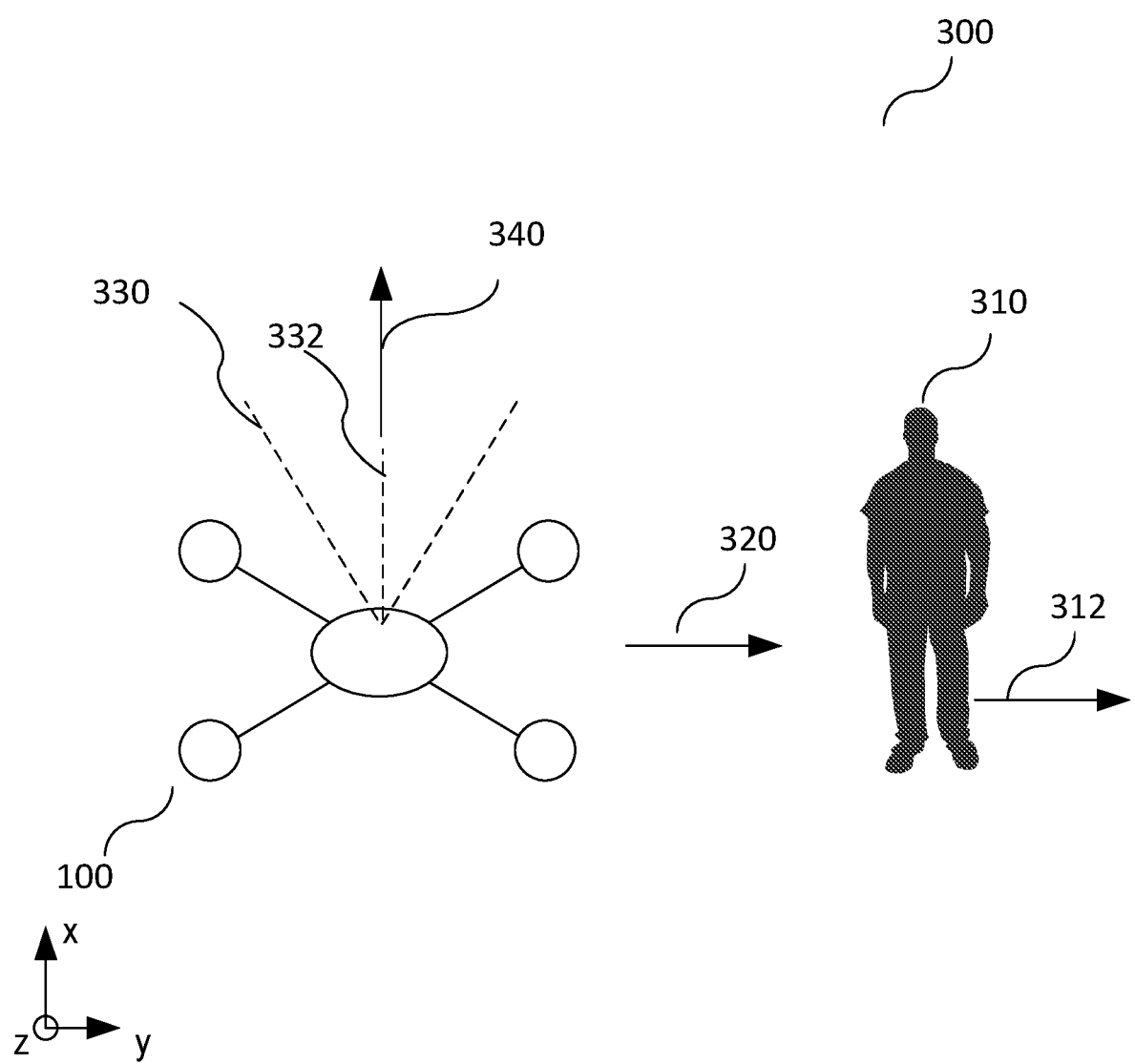
FIGS. 3A and 3B show schematic diagrams illustrating a camera flight tracking mode of an unmanned aerial vehicle.
Figure 3B:
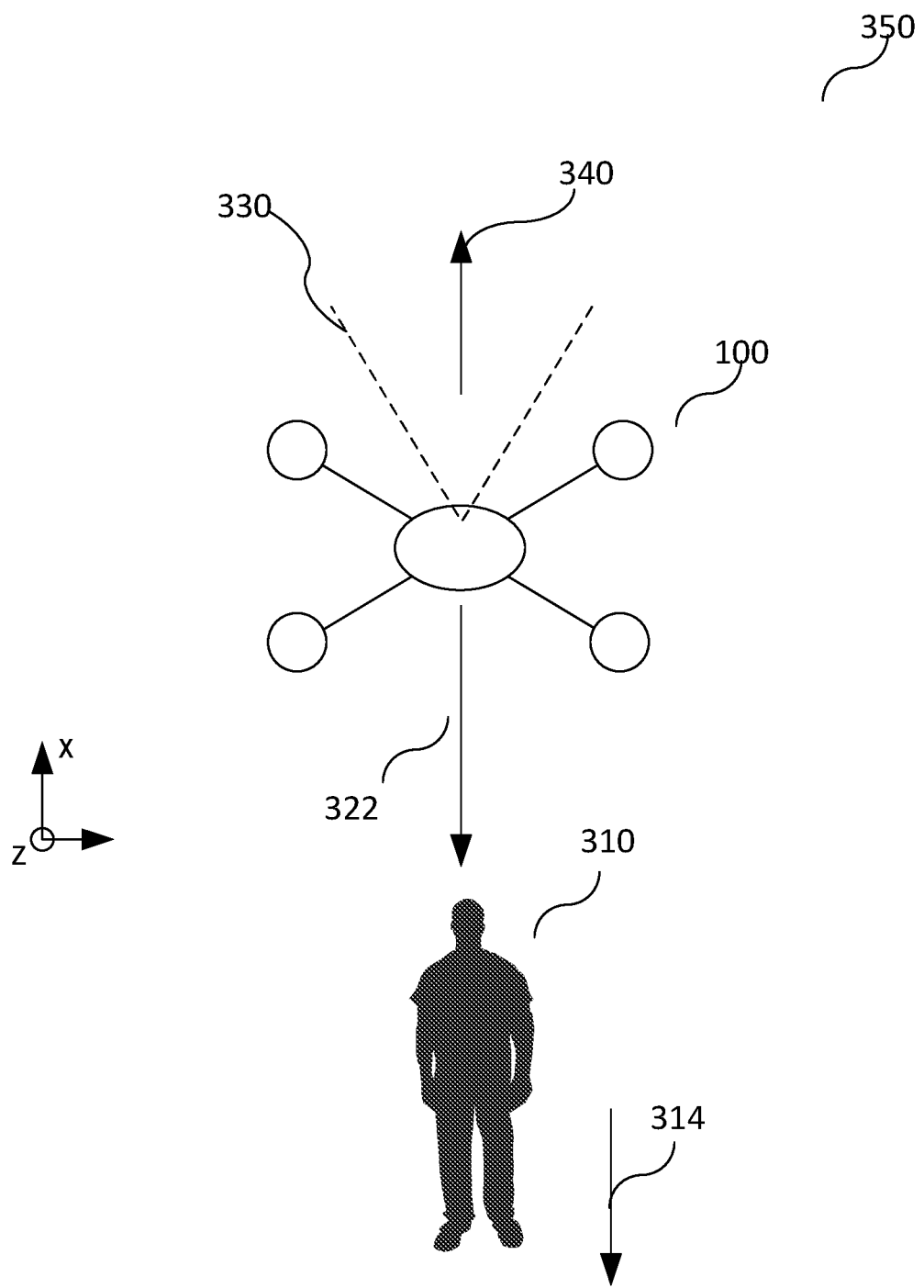

FIGS. 3A to 3B show schematic diagrams illustrating a camera flight tracking mode of the UAV described above. As shown in FIG. 3A, the UAV 100 flies in actual flight direction 340 and the POI 310 moves, e.g. walks, along a direction 312 perpendicular to the actual flight direction 340 (or, without loss of generality, into any other direction that is non-parallel to the actual flight direction 340). In this case, the target camera is rotated by 90 degrees relative to the flight direction and is tracking 320 a relative movement of the POI 310. In tracking the relative movement the movement of the POI 310 and the movement of the UAV 100 are considered in the movement of the gimbal and/or camera holder so as to keep the POI 310 within the focus of the camera mounted in the camera holder of the UAV 100. The movement of the POI 310 is a relative movement of the POI 310 regarding the UAV 100. That is, the UAV 100 may fly and the POI 310 is immobile or the UAV 100 flies and the POI 310 moves.

Obstacle detection or a flight direction 340 may also be applicable when the UAV 100 is hovering, that is to remain in a predefined position in a coordinate system. Hence, the camera of the UAV 100 may operate independent from the sensor and/or an actual move of the UAV 100. The camera in the gimbal may, however, be moved in tracking the POI 310.

Further shown in FIG. 3A, the main axis 332 of a detection angle 330 is parallel to the actual flight direction 340 of the UAV 100 to avoid obstacle collision. As shown in FIG. 3B, the UAV 100 flies in actual flight direction 340 and the POI 310 moves, e.g. walks, along a direction 314 opposite to the actual flight direction 340. The target camera is rotated by 180 degrees relative to the flight direction 340 and is tracking 322 the relative movement of the POI 310.

In addition, the UAV 100 may fly ahead of the POI 310, e.g. in a predetermined distance. Alternatively, the UAV 100 may follow the POI 310, e.g. in a predetermined distance. Further, the flight controller 110, as described herein, may estimate a moving vector (e.g. a moving direction and/or a moving speed) of the POI 310 and alter the flight path of the UAV based on the moving vector. The flight controller 110 may also alter the flight path to avoid collision with one or more detected obstacles. This way, the deviation of the actual distance between the UAV 100 to the POI 310 from the predetermined distance may be reduced. Thus, the amount of movement of the gimbal and/or the camera holder and, thus, the amount of energy to move the gimbal and/or the camera holder may be reduced.

In addition, the UAV 100 and the POI 310 may move in various different directions and, thus, requiring a complex movement of the camera to track the POI 310. The complex movement of the camera may be a movement relative to the flight direction 340. The complex movement may be, as example, a sequence of a vertical, a parallel and/or a perpendicular movement of the camera.

When an unstaffed aircraft is following a target object using target tracking, it may happen that the unstaffed aircraft flies towards an obstacle. In order to avoid that the unstaffed aircraft crashes into the obstacle, the conventional unstaffed aircraft detects the obstacle and stops in front of the obstacle before crashing into the same. However, since the unstaffed aircraft stops in front of the obstacle, the unstaffed aircraft does no longer follow the target object and may therefore even loose contact to the target object. The tracking procedure may thus fail in such a scenario in a conventional unstaffed aircraft.

An unstaffed aircraft and a target tracking method including collision avoidance are provided, as described in more detail below. In various aspects, a controller of the unstaffed aircraft provides a velocity control value in accordance with calculated flight route during the target tracking method. Furthermore, a collision avoidance circuit is provided configured to perform a collision avoidance process using the velocity control value and detected sensor data to determine a possible collision. The result of the collision avoidance process is a collision avoidance velocity value, which the collision avoidance circuit supplies to the controller. The collision avoidance circuit determines the collision avoidance velocity value to the unstaffed aircraft that follows the target along a collision free flight path accordingly.

Illustratively, a collision avoidance process superimposes a conventional velocity control process to enable a dynamic adaptation of the flight path to possible obstacle(s) occurring during the flight.

The superimposition of the collision avoidance process with the "normal" velocity control process allows a collision free target tracking of an unstaffed aircraft without the aircraft stopping in front of a detected obstacle.

The collision avoidance process may easily be incorporated into a conventional control structure of most conventional unstaffed aircrafts, as opposed to other path planning and collision avoidance methods, which need to be deeply integrated into existing control structures and planning algorithms.

The aspects of this disclosure are applicable to different control modes, such as GPS stick control, target following, waypoint following, and the like.

Figure 4A:
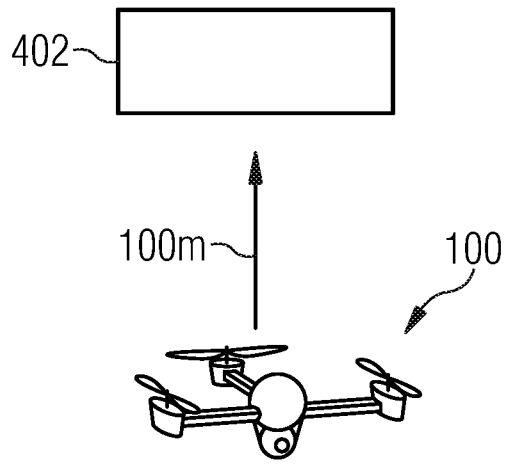
FIGS. 4A to 4I schematically shows an unmanned aerial vehicle avoiding collision with an obstacle.
Figure 4B:
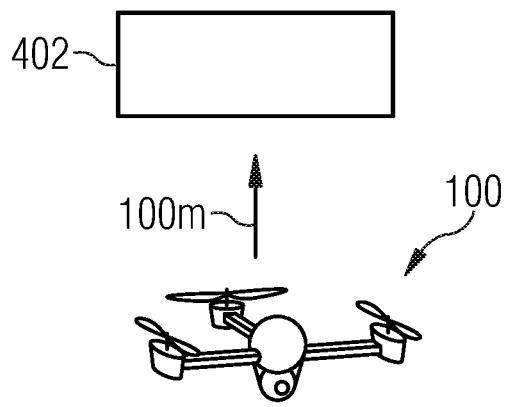
Figure 4C:
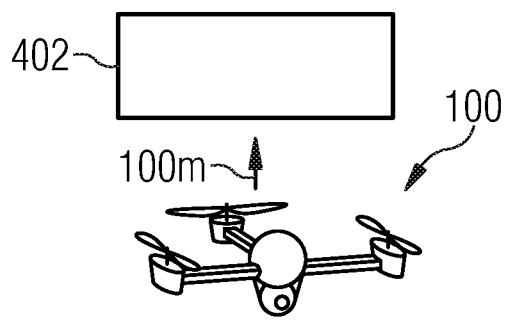
Figure 4D:
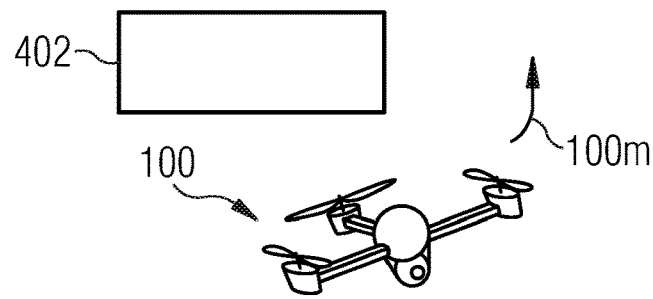
Figure 4E:
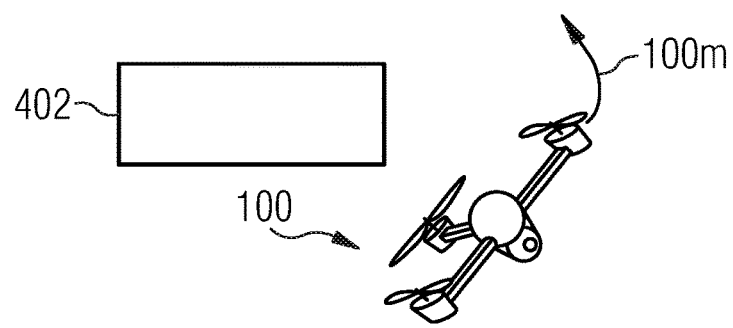
Figure 4F:
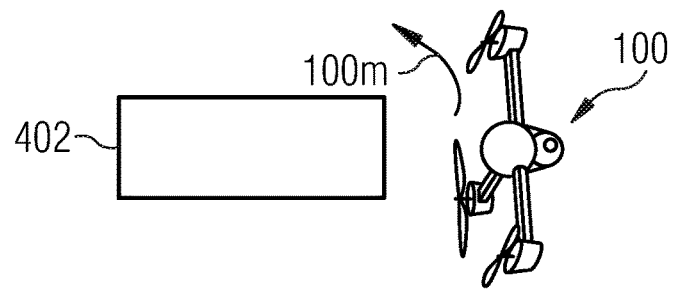
Figure 4G:
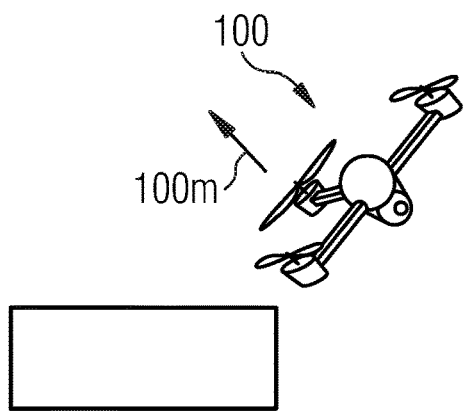
Figure 4H:
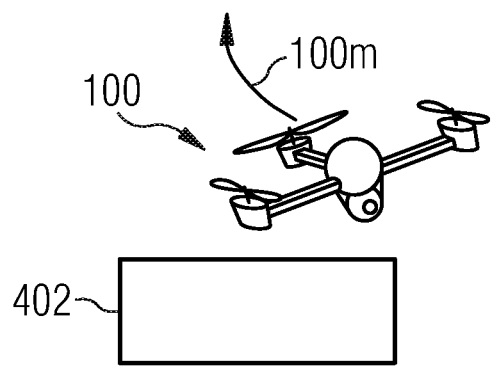
Figure 4I:
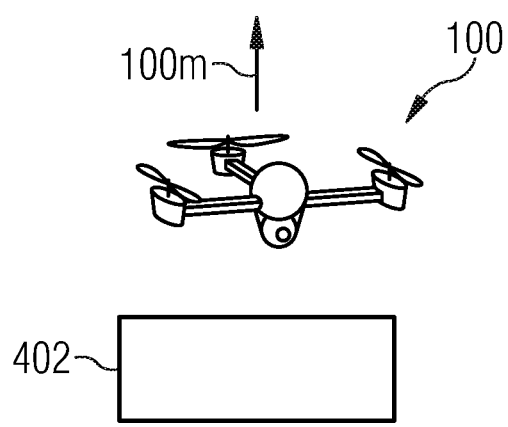

In FIGS. 4A to 4I, a flight of an unstaffed aircraft along a flight direction as symbolized by an arrow 100m is illustrated. As shown in FIG. 4A, the unstaffed aircraft 100 (i.e. an UAV) is intended to fly in a straight direction symbolized in FIG. 4A by a straight arrow 100m. When the unstaffed aircraft detects an obstacle 402 in the flight direction and when the unstaffed aircraft approaches the obstacle, the unstaffed aircraft decreases its velocity while approaching the obstacle, as illustrated in FIG. 4B and FIG. 4C. As soon as the unstaffed aircraft reaches a predefined minimum distance from the obstacle 402, as shown in FIG. 4D, the unstaffed aircraft 100 starts to fly around the obstacle 402, e.g. always keeping the obstacle 402 in the visual field of its obstacle detection sensor (which is, for example, oriented in flight direction of the unstaffed aircraft). This change of the initial flight route continues, as illustrated in FIG. 4E, FIG. 4F, and FIG. 4G), until the unstaffed aircraft 100 determines that no collision with the obstacle is possible any more in case the unstaffed aircraft 100 returns to the initial flight direction. Then, the unstaffed aircraft 100 will step-by-step return to the initial flight route, as illustrated in FIG. 4H and FIG. 4I.

FIG. 5 illustrates a flight of an unstaffed aircraft 100 in accordance with a desired flight path 500p to a target position 504e. The flight path 500p is based on at least an actual position 504a of the unmanned aerial vehicle 100 and a desired target position 504e for the unmanned aerial vehicle 100. The actual position 504a of the unmanned aerial vehicle 100 and the desired target position 504e for the unmanned aerial vehicle 100 also define a flight direction. Illustratively, the flight path 500p may be a global flight path and the UAV 100 may fly in a global flight direction defined by the actual position 504a of the unmanned aerial vehicle 100 and the desired target position 504e for the unmanned aerial vehicle 100. The unstaffed aircraft 100 (i.e. an UAV) is intended to fly in a straight flight path 500p, e.g. along a straight line or with a constant flight direction 502p. When the unstaffed aircraft 100 detects one or more obstacles 402 in the flight path 500p (i.e. in the flight direction 502p) and when the unstaffed aircraft 100 approaches the obstacle 402, the collision avoidance process of the unstaffed aircraft is provided to alter original flight path 500p to a collision free flight path 500f, e.g. by altering the original flight direction 502p and, optionally, the velocity of the UAV 100 to circumvent the one or more obstacles, however, still flying to or following the desired target position 504. The flight direction 502f of the UAV 100 during circumventing the one or more obstacles one the collision free flight path 500f may be different from the original flight direction 502p on the original flight path 500p.

Figure 6A:
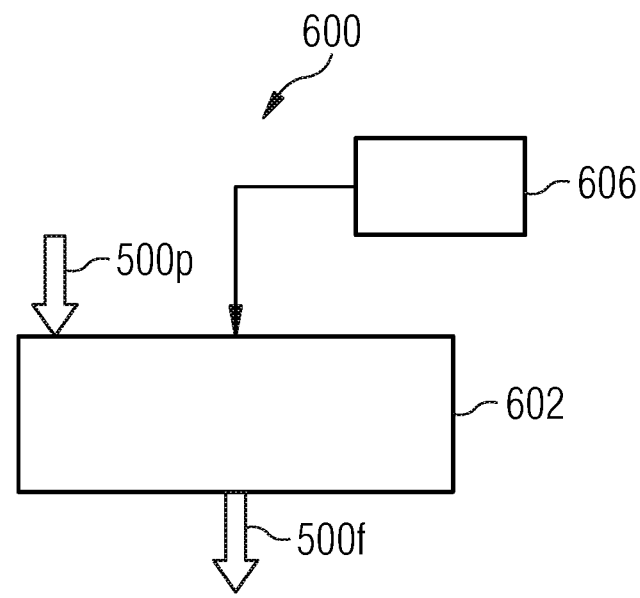
FIGS. 6A and 6B show electronic circuits provided in an unmanned aerial vehicle for collision avoidance.

FIG. 6A illustrates a control scheme of a flight controller or of a part of a flight controller, e.g. of an obstacle avoidance controller 600. The illustrated control scheme may be the control scheme of a sensor and obstacle avoidance (SOA) circuit 600. A suitable corresponding electronic circuits provided in the aircraft is already described with reference to FIG. 1. Some or all of the electronic circuits may be arranged on one or more printed circuit boards (PCBs).

A flight control circuit 602 of the UAV 100 is configured to control flight of the unmanned aerial vehicle 100 and to receive or provide a flight path 500p based at least on an actual position 504a of the unmanned aerial vehicle 100 and a desired target position 504e for the unmanned aerial vehicle 100 (cf. FIG. 5). At least one sensor 606 is configured to monitor an environment of the unmanned aerial vehicle 100 and to detect obstacles 402 in the environment (cf. FIGS. 4A-I and FIG. 5). The flight control circuit 602 is further configured to modify the flight path 500p based on detected obstacles 402 generating a collision free flight path 500f to the desired target position 504e avoiding obstacles 402 in the environment.

The flight direction 502p of the UAV 100 on the flight path 500p based on the actual position 504a of the UAV 100 and a desired target position 504e may be altered while (e.g. only while) the UAV 100 follows the collision free flight path 500f avoiding obstacles 402 in the environment (cf. FIG. 5). The collision free flight path 500f is generated to consider the desired target position 504.

The flight control circuit 602 of the UAV 100 may be configured to provide a collision free flight path 500f by superimposing a flight path 500p and a collision avoidance path in the environment of obstacles 402.

Figure 6B:
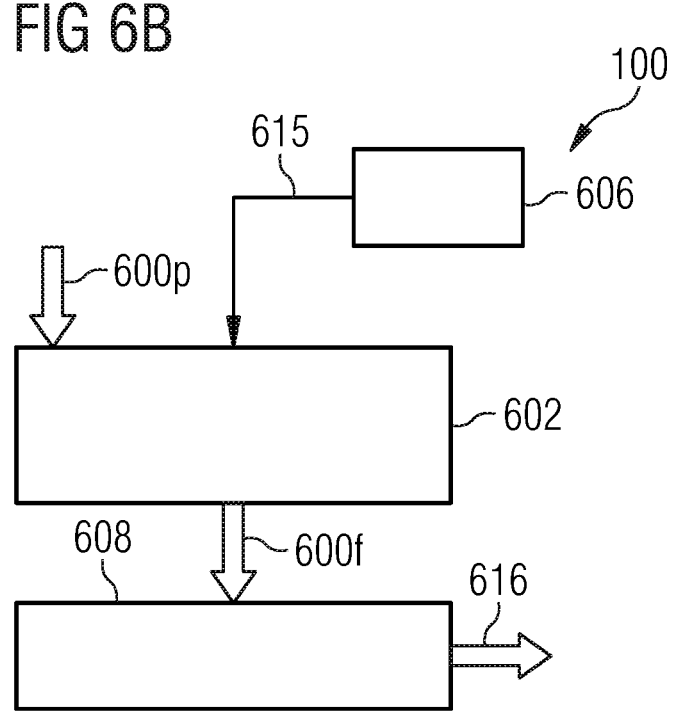

FIG. 6B illustrates a control scheme of a flight controller or of a part of a flight controller, e.g. of a sensor and obstacle avoidance (SOA) circuit 600.

At least one sensor 606 may be configured to sense obstacles 402 in an environment of the UAV 100 and to provide obstacle position data 615. An obstacle avoidance controller 602 may be configured to receive obstacle position data 615 from the at least one sensor 606 and determine obstacle avoidance data based on the obstacle position data. The obstacle avoidance controller 602 may be further configured to receive a first signal 600p representing a first 3D-movement vector of the unmanned aerial vehicle 100, the first 3D-movement vector including a first 3D-direction 502p and a first 3D-velocity. The obstacle avoidance controller 602 may be further configured to generate a second signal 600f based on the first signal and the determined obstacle avoidance data, the second signal 600f representing a second 3D-movement vector of the unmanned aerial vehicle 100, the second 3D-movement vector including a second 3D-direction 502f and a second 3D-velocity, wherein at least the second 3D-direction differs 502f from the first 3D-direction 502p. A motor controller 608 may be configured to control 616 flight of the unmanned aerial vehicle 100 based on the second signal 600f generated by the obstacle avoidance controller 602.

The first signal 600p represents a difference of an actual position 504a of the unmanned aerial vehicle 100 and a desired target position 504e of the unmanned aerial vehicle 100, as describe before referring to the flight path 500p. Illustratively, the first signal 600p represents the flight path 500p. Illustratively, the second signal 600f represents the collision free flight path 500*f*. The second signal 600*f* equals the first signal 600*p* if no obstacle 402 is detected by the at least one sensor 606. The first signal 600*p* is altered to obtain the second signal 600*f* if at least one obstacle 402 is detected by the at least one sensor 606.

Figure 7A:
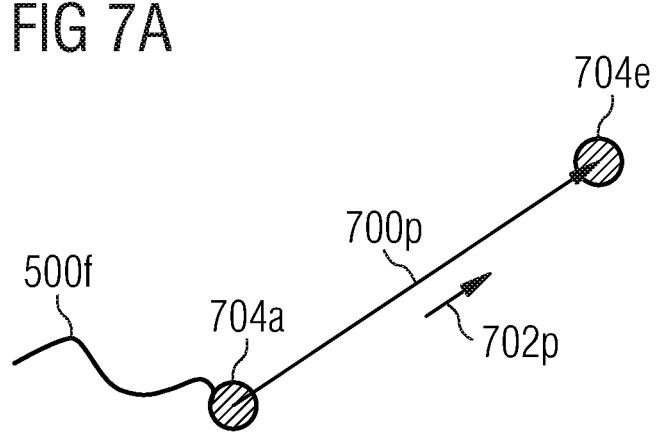
FIGS. 7A and 7B show respectively a schematic diagram of flight of the unmanned aerial vehicle after obstacle avoidance.

FIG. 7A illustrates a flight of an unstaffed aircraft 100 in accordance with a desired flight path 700*p* to a target position 704*e*, after the UAV has avoided a collision 500*f* with one or more obstacles 402. If the target itself is moving, the target position 704*e* may be different from a target position 504*e* before the UAV has avoided a collision 500*f* with one or more obstacles 402. If the target has a fixed position, the target position 704*e* may be the same as the target position 504*e* before the UAV has avoided a collision 500*f* with one or more obstacles 402. After the UAV has avoided a collision 500*f* with one or more obstacles 402, the flight path 700*p* is based on at least an actual position 704*a* of the unmanned aerial vehicle 100 and the desired target position 704*e* for the unmanned aerial vehicle 100. The actual position 704*a* of the unmanned aerial vehicle 100 and the desired target position 704*e* for the unmanned aerial vehicle 100 also define a flight direction 702*p* after the UAV has avoided a collision 500*f* with one or more obstacles 402. The flight direction 702*p* of the UAV after collision avoidance 500*f* may be different from or be substantially the same as the flight direction 502*p* of the UAV before collision avoidance 500*f*.

Figure 7B:
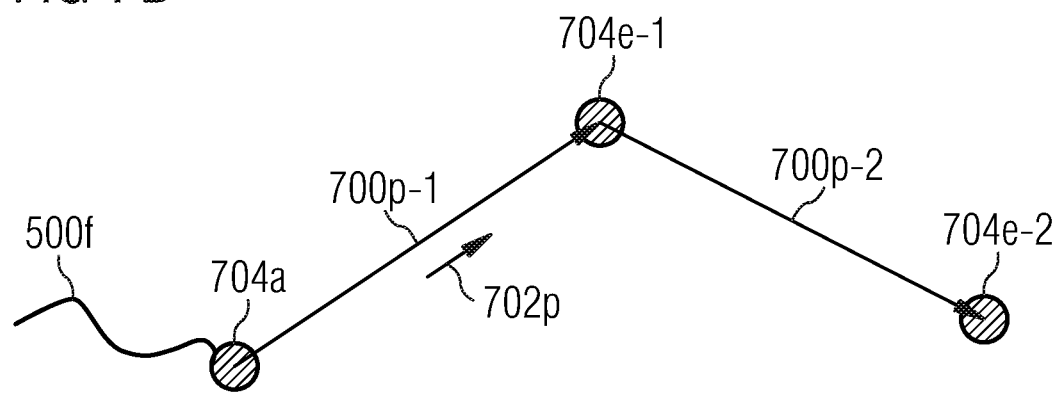

If the flight path is based on waypoints, as illustrated for two waypoints 704*e*-1, 704*e*-2 in FIG. 7B, the waypoint that is the nearest to the UAV may be selected as the next waypoint after the UAV has avoided a collision 500*f* with one or more obstacles 402. Therefore, the UAV may return to the original flight path 500*p* after it has avoided a collision with one or more obstacles 402.

FIG. 7C illustrates a further control scheme of a flight controller or of a part of a flight controller, e.g. of a sensor and obstacle avoidance (SOA) circuit 600.

The flight control circuit is configured to determine an actual flight direction 712 and an actual attitude 714 of the unmanned aerial vehicle 100. The flight control circuit may be configured to adjust the attitude 714 of the unmanned aerial vehicle 100 to align a heading direction 701 of the unmanned aerial vehicle 100 with the actual flight direction 712. In this example, the flight control circuit provides a signal to the motors or motor control circuit to rotate 701*r* the unmanned aerial vehicle 100 to control the UAV 100 to head into the actual flight direction 712. The main detection axis 703*s* of the at least one sensor 606 may be aligned with the heading direction 701 or may define the heading direction 701. Illustratively, the attitude control is considering the heading of the UAV 100, as described before.

Figure 8:
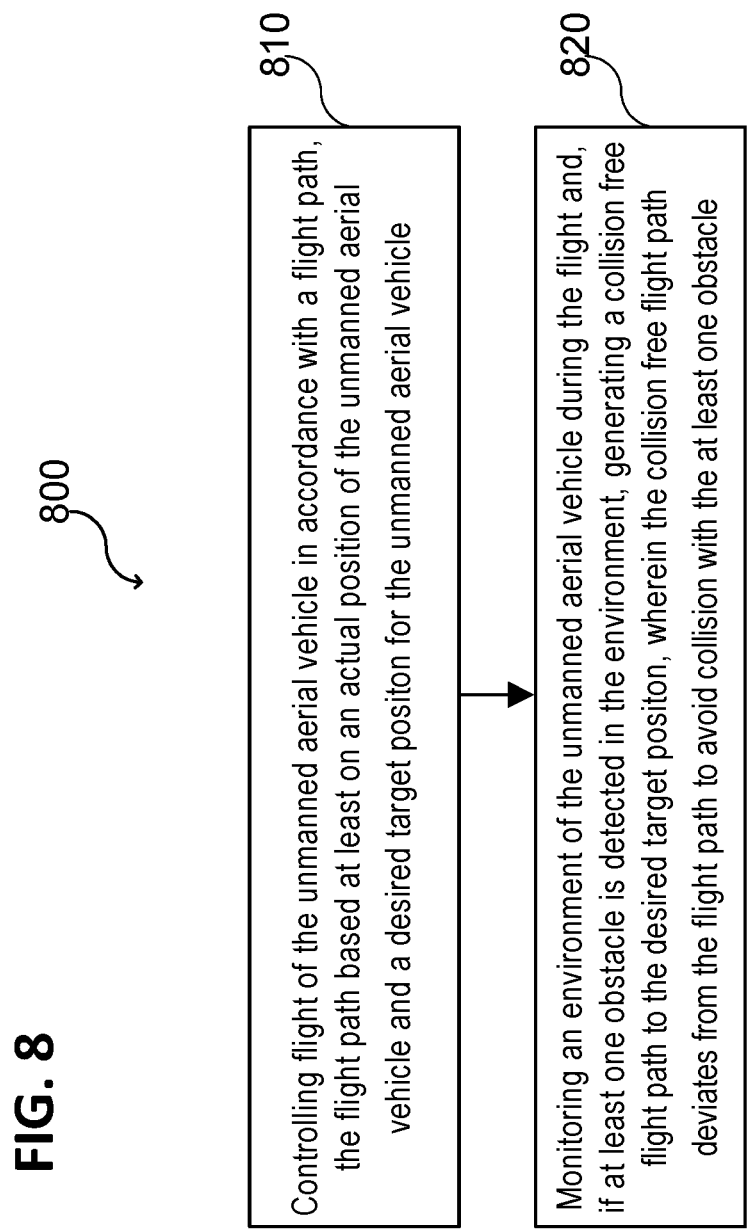
FIG. 8 shows a schematic diagram of a method for controlling an unmanned aerial vehicle.

FIG. 8 illustrates a flow diagram of a method 800 for controlling an unmanned aerial vehicle 100, the method 800 including: in 810, controlling flight of the unmanned aerial vehicle 100 in accordance with a flight path 500*p*, the flight path based at least on an actual position 504*a* of the unmanned aerial vehicle 100 and a desired target position 504*e* for the unmanned aerial vehicle 100; and, in 820, monitoring an environment of the unmanned aerial vehicle 100 during the flight and, if at least one obstacle 402 is detected in the environment, generating a collision free flight path 500*f* to the desired target position 504*e*, wherein the collision free flight path 500*f* deviates from the flight path 500*p* to avoid collision with the at least one obstacle 402, cf. FIG. 5.

The method 800 may further include, determining an actual flight direction 712 and an actual attitude 714 of the unmanned aerial vehicle 100 and to adjust the attitude to align a heading direction 701 of the unmanned aerial vehicle 100 with the actual flight direction 712, cf. FIG. 7C.

As described before, an unmanned aerial vehicle 100 may include: a flight control circuit 600 configured to control flight of the unmanned aerial vehicle 100 and to receive a flight path 500*p* or a signal representing the flight path 500*p*, wherein the flight path 500*p* is based at least on an actual position 504*a* of the unmanned aerial vehicle 100 and a desired target position 504*e* for the unmanned aerial vehicle 100; at least one sensor 606 configured to monitor an environment of the unmanned aerial vehicle 100 and to provide obstacle position data; wherein the flight control circuit is further configured to modify the flight path 500*p* of the unmanned aerial based 100 on an obstacle map generated from the obstacle position data, generating a collision free flight path 500*f* to the desired target position 504*e* by avoiding obstacles 402 in the environment of the unmanned aerial vehicle 100.

As described before, an unmanned aerial vehicle may include: at least one sensor; an obstacle avoidance controller configured to receive sensor data from the at least one sensor, to determine obstacle avoidance data based on the sensor data, to receive a first signal representing a first 3D-velocity, and to generate a second signal based on the first signal and the determined obstacle avoidance data, the second signal representing a second 3D-movement vector including a 3D-direction and a 3D-velocity of the unmanned aerial vehicle that differs from the first 3D-velocity at least in a direction; and a motor controller configured to control one or more motors of the unmanned aerial vehicle in accordance with the second signal generated by the obstacle avoidance controller.

As described before, an unmanned aerial vehicle 100 may include: an obstacle avoidance controller configured to receive sensor data from at least one sensor, to determine obstacle avoidance data based on the received sensor data, to receive a first signal representing a first 3D-movement direction of the unmanned aerial vehicle, and to generate a second signal based on the first signal and the determined obstacle avoidance data, the second signal representing a second 3D-movement direction of the unmanned aerial vehicle that differs from the first 3D-movement direction.

As described before, an unmanned aerial vehicle 100 may include: a flight controller and an obstacle avoidance controller, wherein the obstacle avoidance controller is configured to receive a first signal representing a first 3D-movement vector, to receive a second signal representing a 3D-movement vector change, and to superimpose the first signal and the second signal to provide a collision free flight path considering both, the first 3D-movement vector and the 3D-movement vector change to avoid collision. A motor arrangement is controlled based on both the first signal and the second signal, i.e. the superposition of these two signals.

As described before, an unmanned aerial vehicle 100 may include: a flight control circuit configured to control flight of the unmanned aerial vehicle along an overall flight path; and at least one sensor configured to monitor a local environment of the unmanned aerial vehicle and to detect one or more obstacles in the local environment; wherein the flight control circuit is further configured to: predetermine a collision event based on the overall flight path and at least one detected obstacle in the local environment, and, in case of a collision event, determine a local collision avoidance path in the environment, and generate a collision free flight path by superimposing the overall flight path and the collision avoidance path; wherein the flight control circuit is further configured to control flight of the unmanned aerial vehicle along the collision free flight path.

As described before, an unmanned aerial vehicle 100 may include: a flight controller having a first input and a second input, wherein the flight controller is configured to receive a first signal representing a first 3D-movement vector (and, optionally, a position) of the unmanned aerial vehicle 100 at the first input, and to receive a second signal representing a 3D-movement vector change at the second input, and to control a motor arrangement based on a superposition of the first signal and the second signal. The 3D-movement vector change is generated for example by an obstacle avoidance controller based on obstacle position data obtained from at least one sensor of the unmanned aerial vehicle 100. The second signal is only superimposed with the first signal when as long as an obstacle is detected by the at least one sensor. If no obstacle is detected by the at least one sensor, the second signal is zero or provided to not change the first signal.

As described before, an unmanned aerial vehicle 100 may include: a flight control circuit configured to control flight of the unmanned aerial vehicle and to provide a flight path based at least on an actual position of the unmanned aerial vehicle and a desired target position for the unmanned aerial vehicle; and at least one sensor configured to monitor an environment of the unmanned aerial vehicle and to detect one or more obstacles in the environment; wherein the flight control circuit is further configured to determine a local flight path to avoid a collision with one or more detected obstacles, and to superimpose the flight path with the local flight path to generate a collision free flight path to the desired target position that avoids one or more obstacles in the environment of the unmanned aerial vehicle.

As described before, a method for controlling a flight path of an unmanned aerial vehicle 100 may include: determining obstacle avoidance data based on sensor data from at least one sensor; providing a first signal representing a 3D-movement vector of the unmanned aerial vehicle 100; providing a second signal representing a 3D-movement vector change based on the obstacle avoidance data; generating a motor control signal based on a superposition of the first signal and the second signal; and controlling a motor arrangement of the unmanned aerial vehicle 100 based on the motor control signal.

As described before, a method for controlling a flight path of an unmanned aerial vehicle 100 may include: receiving sensor data from at least one sensor, determining obstacle avoidance data based on the sensor data, receiving a first signal representing a 3D-movement vector of the unmanned aerial vehicle 100, and generating a control signal based on the first signal and the determined obstacle avoidance data to avoid collision.

Figure 9:
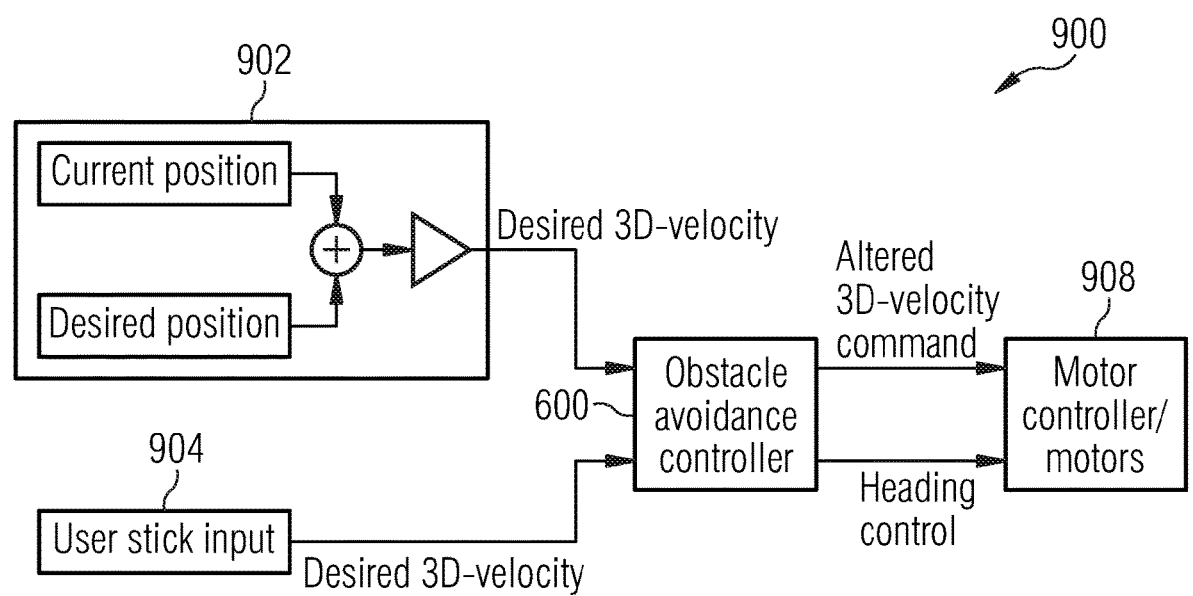
FIG. 9 shows an electronic circuit provided in an unmanned aerial vehicle for collision avoidance.

FIG. 9 illustrates a control scheme of a flight controller 900 or of a part of a flight controller 900, e.g. including a sensor and obstacle avoidance (SOA) circuit 600 (also referred to as obstacle avoidance controller 600).

As illustrated, a desired 3D-velocity, e.g. represented in form of a 3D-movement vector, may be provided to the obstacle avoidance controller 600. A waypoint or tracking controller 902, other another source 902, provides the desired 3D-velocity signal to the obstacle avoidance controller 600 in waypoint or target tracking mode. A user stick 904 provides the desired 3D-velocity signal to the obstacle avoidance controller 600 in manual mode. The obstacle avoidance controller 600 may be configured as described herein, to provide an altered 3D-velocity signal to a motor controller 908 or to provide an altered 3D-velocity signal to a conventional flight controller, wherein the conventional flight controller communicates with the motor controller 908. Further, the obstacle avoidance controller 600 may be configured as described herein, to provide a heading control signal to the motor controller 908. The heading control signal may be provided to align the heading of the UAV 100 into the respectively actual flight direction, i.e. to point the at least one sensor in the actual flight direction. An attitude controller may receive and handle the heading control signal.

Example 1, as described with reference to FIGS. 1 to 9, is an unmanned aerial vehicle, including a flight control circuit configured to control flight of the unmanned aerial vehicle and to provide a flight path based at least on an actual position of the unmanned aerial vehicle and a desired target position for the unmanned aerial vehicle; and at least one sensor configured to monitor an environment of the unmanned aerial vehicle and to detect one or more obstacles in the environment; wherein the flight control circuit is further configured to determine a local flight path to avoid a collision with one or more detected obstacles, and to superimpose the flight path with the local flight path, thereby generating a flight path to the desired target position avoiding a collision with the one or more detected obstacles.

In Example 2, the subject matter of Example 1 can optionally include that the flight control circuit is configured to provide the flight path based on a plurality of waypoints between the actual position and the desired target position.

In Example 3, the subject matter of Example 1 can optionally include that the flight control circuit is configured to provide the flight path based on tracking a movable target, wherein the movable target defines the desired target position.

In Example 4, the subject matter of Example 3 can optionally include that the target is tracked optically and/or based on GPS-information.

In Example 5, the subject matter of Example 1 can optionally include that the flight control circuit is configured to provide the flight path based on a user input. The user input defines a flight direction from the actual position to the desired target position.

In Example 6, the subject matter of Examples 1 to 5 can optionally include that he flight control circuit is configured to remain the flight path unchanged if no obstacle is detected in the environment of the unmanned aerial vehicle to directly head to the target position.

In Example 7, the subject matter of Examples 1 to 6 can optionally include that the at least one sensor is configured to monitor the environment in a radius of about 50 m around the unmanned aerial vehicle.

In Example 8, the subject matter of Examples 1 to 7 can optionally include that the flight control circuit is further configured to determine an actual flight direction and an actual attitude of the unmanned aerial vehicle and to adjust the attitude to align a heading of the unmanned aerial vehicle with the actual flight direction.

In Example 9, the subject matter of Examples 1 to 8 can optionally further include a motor arrangement. Further, the flight control circuit is configured to control one or more motors of the motor arrangement based on the flight path.

In Example 10, the subject matter of Examples 1 to 9 can optionally include that the at least one sensor is configured to detect a distance from the unmanned aerial vehicle to an obstacle.

In Example 11, the subject matter of Examples 1 to 10 can optionally include that the at least one sensor defines a sensing direction substantially aligned with the heading of the unmanned aerial vehicle.

In Example 12, the subject matter of Examples 1 to 11 can optionally further include a camera mount holding a camera; the camera mount is configured to move the camera around at least two different axes.

In Example 13, the subject matter of Example 12 can optionally further include a camera control circuit configured to receive image data from the camera.

In Example 14, the subject matter of Example 13 can optionally include that the camera control circuit is further configured to determine camera mount control data to control movement of the camera mount based on the image data.

Example 15, as described with reference to FIGS. 1 to 9, is an unmanned aerial vehicle, including: at least one sensor configured to sense obstacles and to provide obstacle position data; an obstacle avoidance controller configured to: receive obstacle position data from the at least one sensor and determine obstacle avoidance data based on the obstacle position data, receive a first signal representing a first 3D-movement vector of the unmanned aerial vehicle, the first 3D-movement vector including a first 3D-direction and a first 3D-velocity, and generate a second signal based on the first signal and the determined obstacle avoidance data, the second signal representing a second 3D-movement vector of the unmanned aerial vehicle, the second 3D-movement vector including a second 3D-direction and a second 3D-velocity, wherein at least the second 3D-direction differs from the first 3D-direction; and a motor controller configured to control flight of the unmanned aerial vehicle based on the second signal generated by the obstacle avoidance controller.

In Example 16, the subject matter of Example 15 can optionally include that the first signal represents a difference of an actual position of the unmanned aerial vehicle and a desired target position of the unmanned aerial vehicle.

In Example 17, the subject matter of Example 15 or 16 can optionally include that the second signal equals the first signal if no obstacle is detected by the at least one sensor and wherein the first signal is altered to the second signal if at least one obstacle is detected by at least one sensor.

In Example 18, the subject matter of Examples 15 to 17 can optionally include that the second 3D-velocity differs from the first 3D-velocity.

Example 19, as described with reference, e.g., to FIGS. 3A to 5 and 8, is a method for controlling an unmanned aerial vehicle, the method including: controlling flight of the unmanned aerial vehicle in accordance with a flight path, the flight path based at least on an actual position of the unmanned aerial vehicle and a desired target position for the unmanned aerial vehicle; and monitoring an environment of the unmanned aerial vehicle during the flight and, if at least one obstacle is detected in the environment, generating a collision free flight path to the desired target position, wherein the collision free flight path deviates from the flight path to avoid collision with the at least one obstacle.

In Example 20, the subject matter of Example 19 can optionally include that the method further includes determining an actual flight direction and an actual attitude of the unmanned aerial vehicle and to adjust the attitude to align a heading direction of the unmanned aerial vehicle with the actual flight direction.

Example 21, as described with reference to FIGS. 1 to 9, is an unmanned aerial vehicle, including a flight control circuit configured to control flight of the unmanned aerial vehicle along an overall flight path; and at least one sensor configured to monitor a local environment of the unmanned aerial vehicle and to detect one or more obstacles in the local environment; wherein the flight control circuit is further configured to: predetermine a collision event based on the overall flight path and at least one detected obstacle in the local environment, and, in case a collision event is predetermined, determine a local collision avoidance path in the environment, and generate a collision free flight path by superimposing the overall flight path and the collision avoidance path; wherein the flight control circuit is further configured to control flight of the unmanned aerial vehicle along the flight path, thereby generating the flight path to the desired target position avoiding a collision with the one or more detected obstacles.

In Example 22, the subject matter of Example 21 can optionally include that the flight control circuit is configured to provide the overall flight path based on a plurality of waypoints between an actual position of the unmanned aerial vehicle and a desired target position.

In Example 23, the subject matter of Example 21 can optionally include that the flight control circuit is configured to provide the overall flight path based on tracking a movable target, wherein the movable target defines the desired target position.

In Example 24, the subject matter of Example 23 can optionally include that the target is tracked optically and/or based on GPS-information.

In Example 25, the subject matter of Example 21 can optionally include that the flight control circuit is configured to provide the overall flight path based on a user input, wherein the user input defines a flight direction into a desired target direction.

In Example 26, the subject matter of Examples 21 to 25 can optionally include that the flight control circuit is configured to remain the overall flight path unchanged if no obstacle is detected in the environment of the unmanned aerial vehicle.

In Example 27, the subject matter of Examples 21 to 26 can optionally include that the at least one sensor is configured to monitor the local environment in a radius of about 50 m around the unmanned aerial vehicle.

In Example 28, the subject matter of Examples 21 to 27 can optionally include that the flight control circuit is further configured to determine an actual flight direction and an actual attitude of the unmanned aerial vehicle and to adjust the attitude to align a heading of the unmanned aerial vehicle with the actual flight direction.

In Example 29, the subject matter of Example 28 can optionally further include a motor arrangement. The flight control circuit is further configured to control one or more motors of the motor arrangement based on the attitude.

In Example 30, the subject matter of Examples 21 to 29 can optionally include that the at least one sensor is configured to detect a distance from the unmanned aerial vehicle to an obstacle.

In Example 31, the subject matter of Examples 21 to 30 can optionally include that the at least one sensor defines a sensing direction substantially aligned with the heading of the unmanned aerial vehicle.

In Example 32, the subject matter of Examples 21 to 31 can optionally further include a camera mount holding a camera; the camera mount is configured to move the camera around at least two different axes.

In Example 33, the subject matter of Example 32 can optionally further include a camera control circuit. The camera control circuit is configured to receive image data from the camera.

In Example 34, the subject matter of Example 33 can optionally include that the camera control circuit is further configured to determine camera mount control data to control movement of the camera mount based on the image data.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An unmanned aerial vehicle, comprising:
    a flight control circuit configured to control flight of the unmanned aerial vehicle and to provide a flight path based on an actual position of the unmanned aerial vehicle and a desired target position for the unmanned aerial vehicle; and
    at least one sensor configured to monitor an environment of the unmanned aerial vehicle and to detect one or more obstacles in the environment;
    wherein the flight control circuit is further configured to:
        determine a local flight path to avoid a collision with one or more detected obstacles based on an angle of the target position relative a coordinate frame of the unmanned aerial vehicle; and
        superimpose the flight path with the local flight path, thereby generating a flight path to the desired target position avoiding a collision with the one or more detected obstacles.

2. The unmanned aerial vehicle of claim 1,
    wherein the flight control circuit is configured to provide the flight path based on a plurality of waypoints between the actual position and the desired target position.

3. The unmanned aerial vehicle of claim 1,
    wherein the flight control circuit is configured to provide the flight path based on tracking a movable target, wherein the movable target defines the desired target position.

4. The unmanned aerial vehicle of claim 3,
    wherein the target is tracked at least one of optically and based on GPS-information.

5. The unmanned aerial vehicle of claim 1,
    wherein the flight control circuit is configured to provide the flight path based on a user input, wherein the user input defines a flight direction from the actual position to the desired target position.

6. The unmanned aerial vehicle of claim 1,
    wherein the flight control circuit is configured to remain the flight path unchanged if no obstacle is detected in the environment of the unmanned aerial vehicle to directly head to the target position.

7. The unmanned aerial vehicle of claim 1,
    wherein the at least one sensor is configured to monitor the environment in a radius of about 50 m around the unmanned aerial vehicle.

8. The unmanned aerial vehicle of claim 1,
    wherein the flight control circuit is further configured to determine an actual flight direction and an actual attitude of the unmanned aerial vehicle and to adjust the attitude to align a heading of the unmanned aerial vehicle with the actual flight direction.

9. The unmanned aerial vehicle of claim 1, further comprising:
    a motor arrangement, wherein the flight control circuit is further configured to control one or more motors of the motor arrangement based on the flight path.

10. The unmanned aerial vehicle of claim 1,
    wherein the at least one sensor is configured to detect a distance from the unmanned aerial vehicle to an obstacle.

11. The unmanned aerial vehicle of claim 1,
    wherein the at least one sensor defines a sensing direction substantially aligned with the heading of the unmanned aerial vehicle.

12. The unmanned aerial vehicle of claim 1, further comprising:
    a camera mount holding a camera, the camera mount is configured to move the camera around at least two different axes.

13. The unmanned aerial vehicle of claim 12, further comprising:
    a camera control circuit configured to receive image data from the camera.

14. The unmanned aerial vehicle of claim 13,
    wherein the camera control circuit is further configured to determine camera mount control data to control movement of the camera mount based on the image data.

15. An unmanned aerial vehicle, comprising:
    at least one sensor configured to sense obstacles and to provide obstacle position data;
    an obstacle avoidance controller configured to:
        receive obstacle position data from the at least one sensor and determine obstacle avoidance data based on the obstacle position data,
        receive a first signal representing a first 3D-movement vector of the unmanned aerial vehicle, the first 3D-movement vector comprising a first 3D-direction and a first 3D-velocity, and
        generate a second signal based on the first signal and the determined obstacle avoidance data, the second signal representing a second 3D-movement vector of the unmanned aerial vehicle, the second 3D-movement vector comprising a second 3D-direction and a second 3D-velocity, wherein at least the second 3D-direction differs from the first 3D-direction and the second 3D-velocity prevents the unmanned aerial vehicle from stopping proximate the detected obstacles; and
    a motor controller configured to control flight of the unmanned aerial vehicle based on the second signal generated by the obstacle avoidance controller.

16. The unmanned aerial vehicle of claim 15,
    wherein the first signal represents a difference of an actual position of the unmanned aerial vehicle and a desired target position of the unmanned aerial vehicle.

17. The unmanned aerial vehicle of claim 16,
    wherein the second signal equals the first signal if no obstacle is detected by the at least one sensor and wherein the first signal is altered to the second signal if at least one obstacle is detected by at least one sensor.

18. The unmanned aerial vehicle of claim 15,
    wherein the second 3D-velocity differs from the first 3D-velocity.

19. An unmanned aerial vehicle, comprising:
a flight control circuit configured to control flight of the unmanned aerial vehicle along an overall flight path; and
at least one sensor configured to monitor a local environment of the unmanned aerial vehicle and to detect one or more obstacles in the local environment;
wherein the flight control circuit is further configured to:
predetermine a collision event based on the overall flight path and at least one detected obstacle in the local environment, and,
in case a collision event is predetermined,
determine a local collision avoidance path in the environment, the local collision avoidance path comprising a collision avoidance velocity of the unmanned aerial vehicle, wherein the collision avoidance velocity prevents the unmanned aerial vehicle from stopping proximate the at least one detected obstacle, and
generate a collision free flight path by superimposing the overall flight path and the collision avoidance path;
wherein the flight control circuit is further configured to control flight of the unmanned aerial vehicle along the flight path, thereby generating the flight path to the desired target position avoiding a collision with the one or more detected obstacles.

20. The unmanned aerial vehicle of claim 19,
wherein the flight control circuit is further configured to determine an actual flight direction and an actual attitude of the unmanned aerial vehicle and to adjust the attitude to align a heading of the unmanned aerial vehicle with the actual flight direction.

* * * * *